United States Patent
Lanpher et al.

(10) Patent No.: US 11,961,129 B2
(45) Date of Patent: *Apr. 16, 2024

(54) SYSTEMS AND TECHNIQUES FOR COMPUTER-ENABLED GEO-TARGETED PRODUCT RESERVATION FOR SECURE AND AUTHENTICATED ONLINE RESERVATIONS

(71) Applicant: adidas AG, Herzogenaurach (DE)

(72) Inventors: Gordon Gibson Lanpher, Portland, OR (US); Roger Brandon Beaty, Portland, OR (US); Jonathan Matthew Shaw, Portland, OR (US); Katharine Reinhold, Portland, OR (US); Ryan Robert O. Malia, Portland, OR (US); Megan Murphy Millard, Portland, OR (US); Simon Atkins, Portland, OR (US); Todd Ames, Portland, OR (US)

(73) Assignee: adidas AG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,327

(22) Filed: Mar. 30, 2022

(65) Prior Publication Data
US 2023/0084273 A1     Mar. 16, 2023

Related U.S. Application Data

(63) Continuation of application No. 16/910,983, filed on Jun. 24, 2020, now Pat. No. 11,321,751, which is a (Continued)

(51) Int. Cl.
    *G06Q 30/06* (2023.01)
    *G06F 21/31* (2013.01)
    (Continued)

(52) U.S. Cl.
    CPC ......... *G06Q 30/0601* (2013.01); *G06F 21/31* (2013.01); *G06Q 20/3224* (2013.01); (Continued)

(58) Field of Classification Search
    CPC ............ G06Q 30/0621; G06Q 30/0637; G06F 21/31; G06F 2221/2133; H04L 63/08; H04L 63/107; H04L 2463/082
    (Continued)

(56) References Cited

U.S. PATENT DOCUMENTS 9,355,231 B2  5/2016  Disraeli
10,621,644 B2  4/2020  Andon et al.
(Continued)

FOREIGN PATENT DOCUMENTS

AU    2005234675 B2 *  9/2010  ............. H04L 63/08
KR    101249929 B1 *  11/2011  ......... H04L 63/0236
(Continued)

OTHER PUBLICATIONS

Article, "Optimal Payments Integrates Its NetBanx Payment Gateway to Rona's New E-commerce Website"; Published in Health & Beauty Close-Up [Jacksonville] Aug. 23, 2012, retrieved from Google on May 22, 2023 (Year: 2012).*
(Continued)

*Primary Examiner* — Yogesh C Garg
(74) *Attorney, Agent, or Firm* — Kilpatrick Townsend & Stockton LLP

(57) ABSTRACT

Systems and methods disclosed herein provide a geo-targeted online reservation system that ensures authenticity of customer devices requesting reservations by generating reservations only if threshold authentication conditions are satisfied. For example, a computing device registered with a server system receives inputs for requesting a reservation of a limited release product and for configuring the product. To
(Continued)

authenticate the computing device, the server device transmits an electronic message to the computing device requesting the computing device to respond. A response to the message is one threshold authentication condition for generating the reservation. Upon determining that one or more threshold authentication conditions are satisfied, the server device generates a reservation for the product.

20 Claims, 9 Drawing Sheets

Related U.S. Application Data continuation of application No. 16/298,577, filed on Mar. 11, 2019, now Pat. No. 10,970,761, which is a continuation of application No. 15/183,123, filed on Jun. 15, 2016, now Pat. No. 10,275,823.

(60) Provisional application No. 62/180,022, filed on Jun. 15, 2015.

(51) Int. Cl.
  *G06Q 20/32* (2012.01)
  *G06Q 30/0601* (2023.01)
  *H04L 9/40* (2022.01)

(52) U.S. Cl.
  CPC ..... *G06Q 30/0613* (2013.01); *G06Q 30/0621* (2013.01); *G06Q 30/0625* (2013.01); *G06Q 30/0637* (2013.01); *G06Q 30/0639* (2013.01); *H04L 63/08* (2013.01); *H04L 63/107* (2013.01); *G06F 2221/2133* (2013.01); *H04L 2463/082* (2013.01)

(58) Field of Classification Search
  USPC ...................................................... 705/26.5
  See application file for complete search history.

(56) References Cited

U.S. PATENT DOCUMENTS

| | | | |
|---|---|---|---|
| 2001/0042024 A1 | 11/2001 | Rogers | |
| 2007/0107050 A1* | 5/2007 | Selvarajan | G06F 21/31 713/182 |
| 2008/0098464 A1* | 4/2008 | Mizrah | G06F 21/36 726/5 |
| 2009/0138361 A1* | 5/2009 | Moukas | G06Q 30/0261 705/26.1 |
| 2009/0248548 A1 | 10/2009 | Obermeyer | |
| 2012/0029947 A1 | 2/2012 | Wooldridge et al. | |
| 2012/0084450 A1* | 4/2012 | Nagamati | G06F 21/31 709/229 |
| 2012/0254964 A1* | 10/2012 | Kumar | G06F 21/36 726/7 |
| 2012/0323359 A1 | 12/2012 | Richman | |
| 2012/0323700 A1* | 12/2012 | Aleksandrovich | G06F 21/36 705/14.69 |
| 2012/0323721 A1 | 12/2012 | Koivuniemi | |
| 2013/0191250 A1 | 7/2013 | Bradley et al. | |
| 2013/0275211 A1 | 10/2013 | Lu et al. | |
| 2013/0290080 A1 | 10/2013 | Pacholke et al. | |
| 2013/0346120 A1* | 12/2013 | Kurisu | G06Q 10/02 705/5 |
| 2014/0006146 A1 | 1/2014 | Uribe-Etxebarria Jimenez | |
| 2014/0074617 A1 | 3/2014 | Mukherji et al. | |
| 2014/0230038 A1 | 8/2014 | Leong et al. | |
| 2014/0282991 A1 | 9/2014 | Watanabe et al. | |
| 2015/0088655 A1* | 3/2015 | Taylor | G06Q 30/0264 705/14.61 |
| 2015/0121309 A1 | 4/2015 | Reed | |
| 2015/0149301 A1* | 5/2015 | Dow | G06Q 30/0273 705/14.69 |
| 2015/0149544 A1 | 5/2015 | Zhang | |
| 2016/0364790 A1 | 2/2016 | Costello et al. | |
| 2016/0232515 A1 | 8/2016 | Jhas et al. | |

FOREIGN PATENT DOCUMENTS

| | | | | |
|---|---|---|---|---|
| WO | WO-2007059169 A2 * | 5/2007 | ............ | H04L 51/00 |
| WO | 2014084853 | 6/2014 | | |

OTHER PUBLICATIONS

Article, "Making data theft harder for criminals"; Perlroth, Nicole. International New York Times May 29, 2015: NA.; retrieved from Dialog on Sep. 6, 2023. (Year: 2015).*
"Signifyd Launches Enterprise-Class E-Commerce Fraud Platform", Journal of Engineering, Atlanta, Oct. 30, 2013; 1116, extracted from PQdialog Search on 11/16/20180948151 Notice of Allowance dated Dec. 4, 2018.
U.S. Appl. No. 16/910,983, Non Final Office Action dated Aug. 19, 2021, 20 pages.
U.S. Appl. No. 16/910,983, Notice of Allowance dated Dec. 29, 2021, 11 pages.
U.S. Appl. No. 15/183,123, Non Final Office Action dated Jun. 14, 2018, 21 pages.
U.S. Appl. No. 15/183,123, Notice of Allowance dated Mar. 21, 2019, 4 pages.
U.S. Appl. No. 15/183,123, Notice of Allowance dated Dec. 4, 2018, 12 pages.
U.S. Appl. No. 16/298,577, Non-Final Office Action dated Sep. 24, 2020, 12 pages.
U.S. Appl. No. 16/298,577, Notice of Allowance dated Jan. 26, 2021, 12 pages.

* cited by examiner

200

210 — Receive, on a mobile device registered with a retailer server system, a first communication relating to a launch of a product 220 — Receive a second communication specifying a time period when the product is available for reservation 230 — During the time period when the product is available for reservation, receive an input on the mobile device selecting the product and custom features of the product 240 — Receive, at the mobile device, a short message service text message requesting a response to authenticate a user of the mobile device 250 — Receive a second input on the mobile device for responding to the short message service text message and generating a reservation for the product 260 — Receive, at the mobile device, a third communication identifying a retail location that will have the product in inventory during the launch, the retail location within a certain distance of a geographic location of the mobile device 270 — Receive a fourth communication indicating confirmation of the reservation and identifying the retail location, the confirmation of the reservation including a unique identifier identifying the user, the reserved product, and the custom features of the product

710 — Receive, at a server device for a retailer, an electronic communication from a mobile device requesting reservation for an upcoming product planned for launch by the retailer 720 — Transmitting, to the customer device, a request for response to a short message service text message for authenticating a user of the mobile device, wherein successful receipt of the response to the short message service text message comprises satisfaction of a first threshold authentication condition of one or more threshold authentication conditions for generating a reservation 730 — Subsequent to receiving, from the customer device, the response to the short message service text message, generating a reservation for the user of the mobile device 740 — Storing a reservation record for the generated reservation, the reservation record indicating contact information for the user, the product, and custom features specified in the reservation request

FIG. 7

SYSTEMS AND TECHNIQUES FOR COMPUTER-ENABLED GEO-TARGETED PRODUCT RESERVATION FOR SECURE AND AUTHENTICATED ONLINE RESERVATIONS

CROSS-REFERENCE TO RELATED APPLICATIONS

This is a continuation of U.S. patent application Ser. No. 16/910,983, filed Jun. 24, 2020, which is a continuation of U.S. patent application Ser. No. 16/298,577, filed Mar. 11, 2019 (U.S. Pat. No. 10,970,761), which is a continuation of U.S. patent application Ser. No. 15/183,123, filed Jun. 15, 2016 (U.S. Pat. No. 10,275,823), which claims the benefit of U.S. Provisional Application No. 62/180,022, filed Jun. 15, 2015, the disclosure of each of which is hereby incorporated in its entirety by this reference.

TECHNICAL FIELD

This disclosure relates generally to computer-implemented methods and systems for secure and authenticated geo-targeted product reservation via a mobile application.

BACKGROUND

Product manufacturers and retailers frequently announce and release upcoming products during limited release launch events. For popular and highly anticipated products, these limited release launch events draw long customer lines and cause frustration for potential customers who are unable to purchase the released product on launch day due to insufficient supply and retail locations running out of inventory. Moreover, as retailers allow reservations for products to be made online and over the Internet, these retailers face technical hurdles unique to the online electronic reservation process. For example, for limited release product launches, online "spam bots" are computer programs that automatically generate electronic transmissions designed to mimic a real person. In the context of limited release and highly popular product launches, spam bots mimic online reservation requests, creating fraudulent reservations and reducing the number of available reservations for potential customers. There is a need for better online authentication measures during the online reservation process to combat the rise in spam bots and ensure that the ensuing reservation request is from a real person.

Further, for large and popular retailers, millions of potential customers may be geographically dispersed. Occasionally, a retailer may have a product launch event limited to flagship store. With geographically limited product launches, there is a further need for retailers to be able to refine and control the online reservation process. Thus, another technical hurdle unique to the electronic reservation process used by retailers, particularly for retailers that have product launches limited to a flagship store, is in controlling and limiting the reservation requests so that only potential customers near the vicinity of the launch event will be able to complete the reservation.

In addition, current processes for launching new products and making said products available to customers who have reserved the products rely on traditional methods of manufacturing and distribution. For example, retailers and manufacturers produce a limited set of inventory via centralized manufacturing methods and distribute the limited inventory to the one or more retail locations that will be hosting the product launches. Retailers and manufacturers incur shipping and other overhead costs with the current system.

SUMMARY

Systems and methods provided herein disclose a computer-enabled geo-targeted product reservation system that allows retail customers to reserve products at retail stores within a geo-targeted area and securely retrieve the reserved products. The product reservation system includes a customer mobile application that provides retail customers a secure mechanism for remotely reserving retail products without having to physically visit a retail location, presents instant confirmation of product availability in inventory at a nearby retail location, and allows retail customers to securely retrieve the product at the retail location without having to wait in long lines. In additional embodiments, upon securely reserving retail products via the mobile application, the product reservation system provides retail customers confirmation of products that are available via a real-time manufacturing process at a nearby retail location. For example, a retailer may introduce products that are manufactured in real-time (e.g., via addictive manufacturing such as 3D-printing) during a product launch event.

The product reservation system includes a mobile application that receives and presents notifications of upcoming retail products. The mobile application may receive inputs from a retail customer for selecting one or more of the upcoming retail products for reservation. Upon selecting a retail product, an electronic transmission confirming the reservation (e.g., via an electronic message such as a short message service (SMS) text message, push notification, email message, or other message) is provided to the mobile application. To confirm the authenticity of the reservation, the customer device receives inputs from the user to communicate a reply to the message. The mobile application further detects the location of the customer device and determines the closest retail location that has or will have the upcoming retail products in inventory. In some aspects, the mobile application may only allow reservation of the upcoming retail product if the customer device is located within a certain geographic region. In some embodiments, once the product is launched and in inventory, the mobile application displays, to the retail customer, a notification indicating that the product is available and information directing the customer to the geographic location of the retail location. In other embodiments, during a product launch event, the mobile application displays, to the retail customer, a notification identifying a nearby retail location that may manufacture the product via a real-time manufacturing process for the customer. The mobile application also displays on the customer device a unique identification code that identifies the retail customer and the reserved product. At the retail location, an agent of the retailer may use a companion mobile application to scan the unique identification code displayed by the customer device. The companion mobile application displays the reservation details, including the specific product reserved, on a user interface of the companion mobile application. Using the information provided on the companion mobile application, the retailer can retrieve the specific product for the customer.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 2 is a flowchart depicting an example process for a mobile application that provides secure geo-targeted product reservation for upcoming and unreleased products at a nearby retail location.

FIG. 7 is a flowchart depicting an example process for a server application that generates secure reservations upon determining that threshold authentication conditions are satisfied, according to certain embodiments herein.

DETAILED DESCRIPTION

Figure 1:
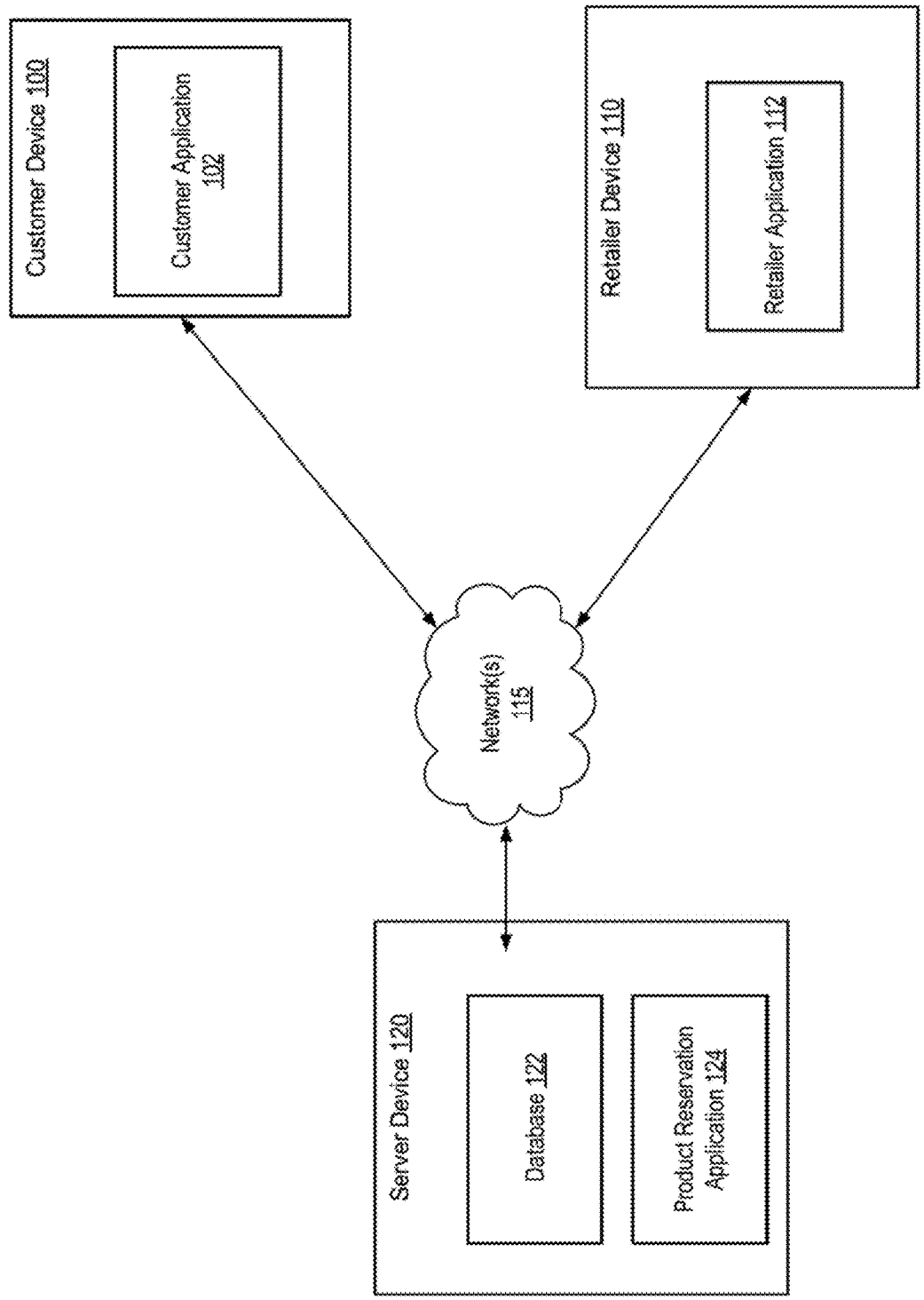
FIG. 1 is a block diagram depicting an example of a system for a geo-targeted product reservation system, according to certain embodiments herein.

The geo-targeted product reservation system described herein provides retail customers a secure and efficient mechanism for finding and purchasing anticipated products via their customer devices. The product reservation system also provides retail customers control over limited product launches and allows all potential customers fair access to limited releases. By using the product reservation system, potential customers do not have to wait in long lines during a new product launch, thus reducing crowds and long wait periods. Additionally, in some embodiments, the product reservation system identifies retail locations in which the customers may obtain reserved products that are produced on demand via a real-time manufacturing process. Real-time manufacturing processes include any manufacturing or assembling process that is performed on demand for a customer (e.g., a rapid prototyping process or an additive manufacturing process such as 3D-printing). By using the product reservation system to receive secure reservations from customers and direct the customers to nearby locations with real-time manufacturing capabilities, retailers are able to provide highly anticipated product releases to numerous customers on demand or at specific time frames while also reducing shipping and overhead costs that would otherwise be incurred by traditional methods of centralized manufacturing and distribution of products to retail locations for product launches.

Further, because the product reservation system can authenticate the customer's reservation via an electronic message (e.g., an SMS text message or other form of messaging) or by exchanging a unique authentication key (e.g., a two-dimensional bar code, QR code, or similar identifier), the system protects against abuse and potentially fraudulent reservations that could be generated by automated bots. The product reservation system can also protect against potentially fraudulent reservations by denying service to computer devices that have had hardware and software restrictions removed or altered (e.g., "jailbroken" or "rooted" mobile devices).

The product reservation system disclosed herein allows for secure and authentic electronic reservations on limited release product launches from numerous potential customers that may be geographically dispersed. For example, a retailer server system is configured with threshold authentication conditions that indicate one or more rules for generating a reservation in response to a reservation request from a customer. In embodiments disclosed herein, the retailer server system generates electronic reservations only if the one or more threshold authentication conditions are satisfied. For example, one example of a threshold authentication condition is successful exchange of an electronic message (e.g., short message service (SMS) text messages, push notifications, emails, and other forms of messages) between a retailer server device and the customer's mobile device (referred to herein as either "customer device" or "mobile device.") Another example of a threshold authentication condition is identifying that the customer device is within the geographic proximity of the retail location where the product will be launched. Another example of a threshold authentication condition is determining that the customer device is not rooted or jailbroken. By generating reservations only when the threshold authentication conditions are satisfied, the product reservation system provides a secure mechanism for efficiently controlling the online and electronic reservation process for product launch events.

Referring now to the drawings, FIG. 1 is a block diagram depicting an example of a geo-targeted reservation system that includes a customer device 100 executing a customer mobile application 102, a retailer device 110 executing a retailer application 112, and a server device 120 executing a product reservation application 124. The customer device 100 and the retailer device 110 communicate with each other and with the server device 120 via one or more networks 115. The server device 120, customer device 100, and retailer device include or have access to one or more non-transitory computer-readable media on which program code and data are stored (e.g., program code defining the product reservation application 124, customer application 102, and retailer application 112). Further, the server device 120 includes a data storage medium, shown as database 122. The database 122 stores information on upcoming product launches by the retailer, registered customer information (e.g., the customer's contact information and demographic information), and identification of the specific products and custom features for which the customer has registered. In some embodiments, the server device 120 may be a single server. In other embodiments, the server device 120 includes multiple computing systems that are configured for grid-based computing or cloud computing. The server device 120 can be a computing system located at a retail location or can also be a third party computing system located remote from the retail location.

The customer device 100 can include any computing device used by a potential retail customer to search for and reserve upcoming products that will be launched by a retailer. The operations described below may be performed by the customer device 100 via the customer application 102. For example, a customer application 102 executing in a non-transitory computer readable media in the customer device 100 displays a user interface that prompts a user to sign up or register for notifications regarding upcoming product launches. As part of the sign up process, the customer device 100 receives inputs specifying personal information about the user of the customer device 100. For example, the customer application 102 prompts the user for the user's name, cellular phone number, and email address. The customer device 100 provides the user's responses to the server device 120, which stores the user's responses in the database 122. Before the product is launched, the customer device 100 can receive, from the server device 120, marketing notifications informing the user about details and advertisements of the upcoming product to generate hype and improve public of the product. The server device 120 can transmit such marketing notifications to all customer devices 100 that registered with the server device 120.

During a certain pre-determined time period before the product is launched (e.g., a 24-48 hour window before launch), the server device 120 may communicate a signal to the customer device 100 indicating that product reservations are now open. The customer application 102 executing on the customer device 100 presents a notification a display of the customer device 100 informing the user that the product is open for registration. During this reservation window, the customer device 100 may receive inputs on the user interface of the customer device 100 from the user (the potential retail customer) selecting the product for reservation. The customer device 100 may also receive inputs from the user selecting specific product customizations for the reserved product. For example, if reserving a new and upcoming brand of sneakers, the customer can select product customizations including the desired color of the sneaker and the size of the sneaker. The user interface of the customer application 102 may present, for example, a size range prompt allowing the customer to select a size within their specific size range should the desired size be unavailable. The customer device 100 can transmit information specifying the reserved product and the custom features to the server device 120.

To confirm the authenticity of the reservation, the server device 120 can communicate an electronic message message to the customer device 100 and request response to the message. If the electronic message is an SMS text message, the server device 120 can communicate the message to the cellular phone number the user of the customer device 100 provided during the sign up/registration process described above. Similarly, if the electronic message is in the format of an email message, the server device 120 communicates the message to the email address the user of the customer device 100 provided during registration. The message can include details of the reservation, including the requested custom features. The reservation may not be complete until the server device 120 receives a response to the message from the customer device 100. This helps ensure that the product reservation did not originate from an automated bot or from another fraudulent source.

In some aspects, the customer application 102 may identify the geographical location of the customer device 100 and determine nearby retail locations that will carry the product in inventory during launch. Alternatively, the customer application 102 may determine nearby retail locations or other locations that will produce the reserved product via a real-time manufacturing process. For example, the customer application 102 may identify the geographic coordinates of the customer device 100 via any suitable mechanism for location tracking. Examples include the use of a GPS positioning module to identify the geographic coordinates, triangulating the geographic coordinates via nearby cellular towers, identifying locations of nearby wireless access points, as well as others. Using the identified geographic coordinates of the customer device 100, the customer application 102 also identifies nearby retail locations that will have the product in inventory during launch of the product or that are capable of real-time manufacturing of the product. Information indicating geographic coordinates of the retailer locations may be included as part of the customer application 102. In other aspects, the customer application 102 may transmit the geographic coordinates of the customer device 100 to the server device 120. The server device 120 determines nearby retail locations that will carry the product in inventory during launch or that will provide the products via real-time manufacturing processes and transmit the coordinates of the nearby retail locations to the customer device 100. The customer application 102 further displays, via a user interface, a map indicating the location of the customer device 100 and the nearby identified retail locations that will carry the product. The customer device 102 may receive inputs selecting a particular retail location. The customer device 100 then transmits the selected retail location to the server device 120, completing the reservation.

In some aspects, the product launch event may be at a single geographic location. For example, a retailer may choose to launch the product specifically in a retail location in New York City. In this aspect the customer application 102 can compare the identified coordinates of the customer device 100 with the coordinates of the launch event to confirm if the customer device 100 is within a certain distance of the launch event. In this aspect, the customer application 102 may only allow reservation of the product if the customer device 100 is within a certain distance of the launch event. In this aspect, since location is a primary factor in establishing which consumers should have access to reserve a product, the customer application 102 protects against potential location spoofing. For example, for a product launch in New York City, a fraudulent party in Los Angeles may try to alter hardware and/or software restrictions on a customer device so that the customer application incorrectly identifies the geographic coordinates of the computing device to be within New York City. The customer application 102 can protect against such fraudulent location spoofing. For example, the customer application 102 can protect against fraudulent location spoofing by detecting if the software and/or hardware restrictions on customer device 100 have been altered (e.g., the customer device 100 has been "jailbroken" or "rooted"). The customer application 102 can deny service if software/hardware restrictions on customer device 100 have been altered. In some aspects, the server device 120 can detect if hardware/software restrictions on customer device 100 have been altered and deny reservation requests from customer devices with altered hardware/software restrictions.

The server device 120 stores, in database 122, the product reservations and customizations received from various registered customer devices and the retail locations selected by the customer devices. Each retail location may have access to the product reservation details, allowing the retailer to ensure that inventory of each retail location is stocked with the product as customized for each customer that reserved the product.

The identification of the geographical coordinates of the customer device 100 and the identification of nearby retail locations that will carry or manufacture the product can occur during the reservation process (as described above). Alternatively, this can also occur before the reservation process as part of sign up/registration or at another time before the reservation process.

Once the product is reserved by the user, the server device 120 provides a communication to the customer device 100 indicating a period of time during which the user can retrieve the product at the selected retail location. The customer application 102 displays the communication to the user on the user interface for the customer device 100. The communication can specify a period of time to retrieve the reserved product or can inform the user that the product will be available for retrieval on a certain date. For example, for an anticipated product launch, the customer application 102 displays a notification received from the server device 120 indicating that the reserved product will be available for retrieval on the launch day. Leading up to the retrieval period, the customer device 100 receives advertising messages from the server device 120 and other marketing messages providing details on the reserved product. These messages can help increase awareness and hype of the upcoming product launch. The server device 120 also transmits notifications regarding the product to customers that have signed up/registered with the retailer via one or more social networking platforms and/or email.

As discussed above, in some embodiments, the reserved product is made available to the customer via a real-time manufacturing process. In one example, the retailer may make highly anticipated product launches available at a specific location during a particular time frame (e.g., a product launch may occur at a stadium during a sporting event or at a flagship store for the retailer during a specific time frame). The server device 120 transmits notifications to the customer device 100 informing customers that the product will be manufactured for the customer on-site via a real-time manufacturing process.

Once the product is launched by the retailer and during the period of time the customer may retrieve the reserved product, the customer device 100 may receive another notification message from the server device 120 that the reserved product is ready for pick up. The customer application 102 also receives a unique identifier code from the server device 120. The unique identifier code can be a QR code, barcode, or other code that identifies the customer and the reserved product. At the retail location, an agent of the retailer can scan the unique identifier code displayed by the customer device 100. The retailer device 110 can execute a retailer application 112 in a non-transitory computer readable media in the retailer device 110. The retailer application 112 can be used to scan the unique identifier. Any method of scanning can be used. For example, the retailer application 112 can detect the unique identifier displayed on the customer application 102 by capturing and analyzing the unique identifier by a camera. Other methods are also possible. The unique identifier may include information specific to the reservation. For example, in some embodiments the unique identifier indicates the customer's name and contact information and further identifies the specific product reserved as well as the configuration of the product desired by the customer (e.g., size or color of a sneaker). In other embodiments, upon scanning the unique identifier presented on the customer device 100, the retailer application 112 requests the customer information and product reservation details from the server device 120.

To verify the authenticity of the unique identifier displayed on the customer application 102, the customer application 102 may display an authentication animation on the customer device 100. The authentication animation comprises a unique repeating graphical animation on the customer device 100. For example, the customer application 102 may display a spinning logo specific to the brand of the retailer. This unique graphical animation can further help ensure that the displayed unique identifier on the customer device 100 is authentic and not fraudulent (e.g., not from a screenshot or a fabricated identifier). Use of the retailer device 110 in tandem with the customer device 100 to confirm the reservation details can help ensure a verified and authentic transaction process. The agent at the retailer can then use the reservation information identified via the unique identifier to retrieve the reserved product from inventory for the customer. In other embodiments, the agent at the retailer can use the reservation information identified via the unique identifier to initiate a real-time manufacturing process that assembles or prints the product unique to the customer as customized by the customer (e.g., by 3D-printing or otherwise assembling a sneaker or other piece of footwear or other apparel in real-time according to the selected color and size).

In some embodiments, double QR codes may be used as additional authentication to confirm that the consumer purchasing the product during payment is the same customer that made the original reservation. For example, in some retail locations, a sales associate retrieves the product for the customer and then the customer makes payment for the product with a cashier. In some embodiments, upon being notified that he product is ready for pickup, the customer device 100 receives a first unique identifier code from the server device 120. At the retail location, an agent of the retailer scans the first unique identifier code displayed by the customer device 100. The retailer application 112 scans the first unique identifier and generates a second unique identifier, which may also be a QR code, bar code, or other identifier. The retail application 112 wirelessly transmits the second unique identifier to the customer application 102. When completing payment for the product with a cashier of the retailer, the customer presents the second unique identifier (which the customer application 102 displays on the display of the customer device 100) to the cashier. The retailer may allow purchase, for example, only upon correctly displaying the second unique identifier by the customer application 102. The use of double QR codes (i.e. double unique identifiers), one presented to the sales agent for retrieving the product, and the second presented to the cashier of the retailer for making payment and completing the transaction, provides further authentication and security during popular product launch events.

FIG. 2 is a flow chart depicting an example of a process 200 executable by the customer device 100 for a geo-targeted product reservation system. For illustrative purposes, the method 200 is described with reference to the implementation in FIG. 1. Other implementations, however, are possible.

The process 200 includes receiving, on a customer device registered with a retailer server system, a first communication relating to a launch of a product, as shown in block 210. The retailer server system comprises, for example, the server device 120 and/or the retailer device 110. Registration with the retailer server system includes register a user account with the retailer and providing the retailer with the user's name and contact information. After a customer has registered with the retailer using the customer application 102, the customer device 100 can receive, from the server device 120, a notification regarding upcoming product launches. The notification can include marketing materials or advertisements informing the registered user any details of the upcoming product. For example, if the upcoming product is a limited release item that will be launched at a particular retail location, the notification from the server device 120 can include information about the limited release. At this time, the upcoming product may not be available for reservation. Thus, the first communication can serve as marketing communication to generate hype and awareness of the upcoming product.

The customer device 100 can then receive a second communication specifying a time period when the product is available for reservation, as indicated in block 220. The second communication can include a specific time period informing the customer when the upcoming product can be reserved using the customer application 102. In some embodiments, instead of receiving separate communications, the customer device 100 receives one electronic communication from the retailer server system remote from the customer device. The electronic communication provides notification regarding the upcoming launch of the product(s) and a time frame during which the product is available for reservation.

Figure 4:
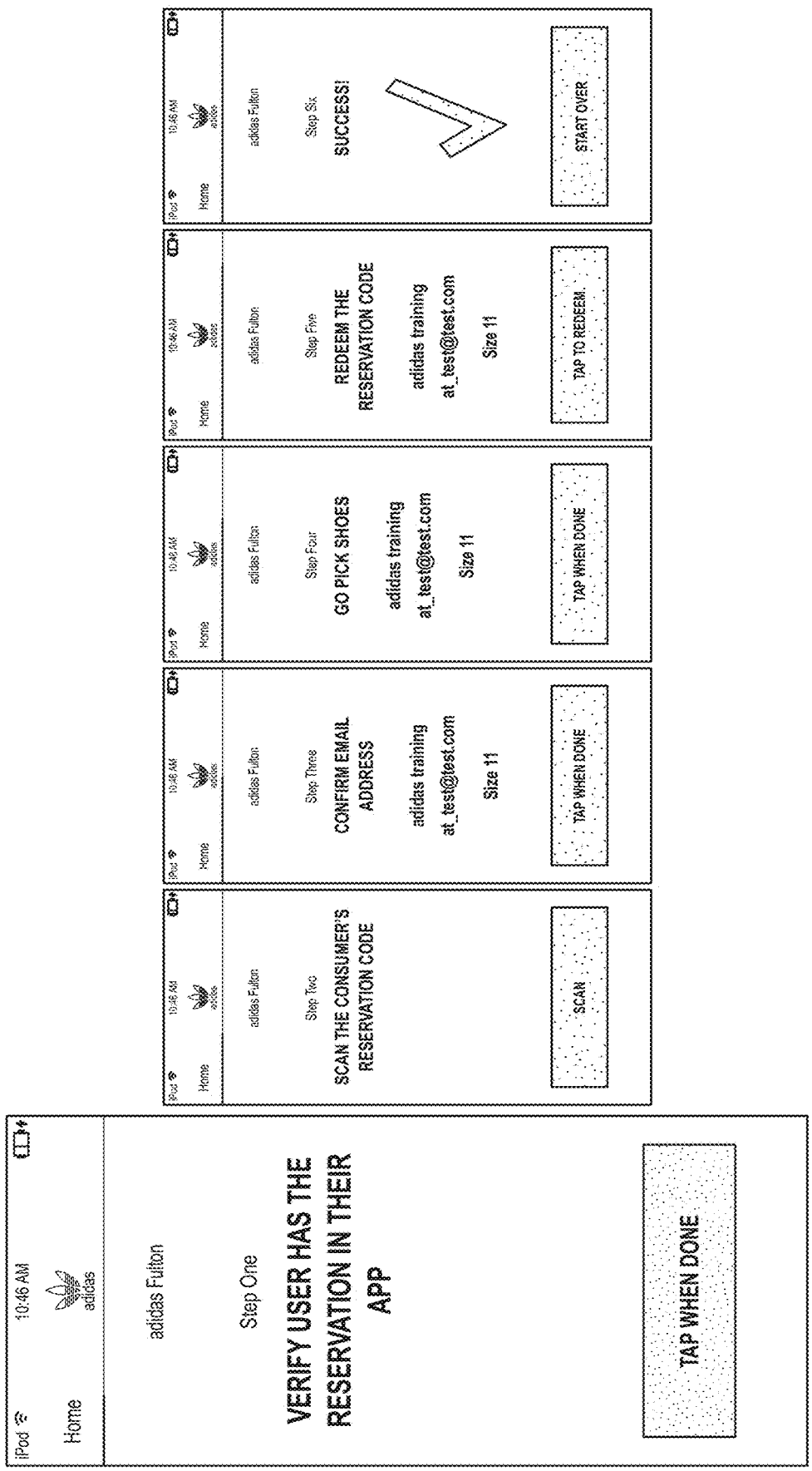
FIG. 4 is an example of a screen for a user interface displayed on a retailer application that verifies that the customer has placed a reservation for a product, according to certain embodiments herein.
Figure 5:
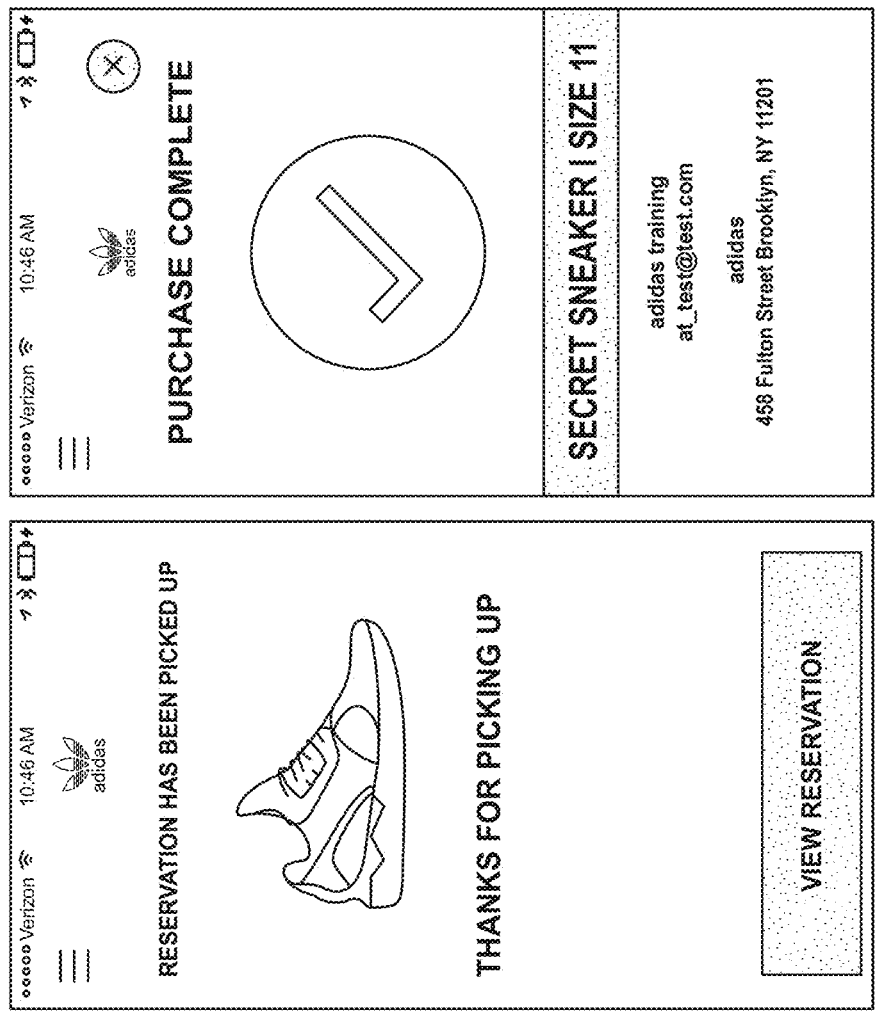
FIG. 5 is a further example of a user interface displayed on a customer application for confirming pick up of a reservation, according to certain embodiments herein.

During the time period when the product is available for reservation, the customer device 100 can receive an input selecting the product and custom features for the product, as shown in block 220. For example, the customer device 100 can present a user interface (e.g., a graphical user interface as depicted in FIGS. 3-5 below) via the customer application 102. The user interface can display the product(s) available for reservation. The user of the customer device 100 can select a product for reservation and further specify any custom features, such as a desired color and a size of the product if the product is apparel (e.g., a sneaker or other footwear). The customer device 100 can transmit the user selection to the server device 120. In some embodiments, when the product is footwear, the user interface on the customer device 100 presents a size range prompt, allowing the customer to select a size within their specified size range in case the customer's desired size is unavailable (e.g., if a threshold number of customers have already reserved the particular size and color of product desired by user of customer device 100). For example, for a size X the size range may be X−0.5, X, X+0.5, X+1.0. Further, in some embodiments, if a size selected by the customer is unavailable, the user interface of the customer device 100 may display a countdown prompt allowing the customer to select an alternate size. For example, a countdown prompt displayed on the user interface prompts the user to reserve a product with an alternate configuration (e.g., within the user's size range) should the preferred size be unavailable.

As described above, the server device 120 generates a reservation in response to the reservation request from the customer device 100 only if one or more threshold authentication conditions are satisfied. One example of a threshold authentication condition is a response, by the customer device 100, to an electronic message transmitted by the server device 120. Electronic messages transmitted by the server device 120 may be in any suitable format. For example, forms of electronic messages include, but are not limited to SMS text messages, tweets, push notificaitons, iMessages, email messages, and social network tags. To authenticate the reservation, the customer device 100 can receive a message requesting a response, as shown in block 240. The message can be received from the server device 120 and can include information that specifies the details of the product selection and custom features. The customer device 100 can receive a second input for responding to the message, as shown in block 250. For example, the response to the message from the server device 120 includes a confirmation message (e.g., confirmation email, confirmation SMS text message, or other form of message) from the customer device 100. The response from the customer device 100 can be transmitted to the server device 120. By requiring the customer device 100 to respond to a request for an electronic message before generating a reservation for a product, the product reservation system disclosed herein ensures that the product reservation is genuine and authentic and not received from automated bots.

In some embodiments, once a message is received from the customer device 100 (and once other possible threshold authentication conditions are satisfied), the server device 100 generates a reservation for the product as selected and customized by the user of customer device 100, specific to the user of customer device 100. The server device 120 can store in database 122 details of the various reservations received from different customer devices. For example, for each customer that reserves a product from the retailer, the server device 120 stores in database 122 information indicating the name and contact information for the customer, demographics information of the customer, identification of the product selected by the customer, and/or the specific configuration (e.g., size and color if the product is footwear) selected by the customer.

Responding to the message from the server device 120 is one example of a threshold authentication condition. Another example of a threshold authentication condition includes identifying that the geographic location of the customer device 100 is within a predefined proximity to the retail location that will have the product in inventory upon launch. This allows retailers to control an online reservation system for popular product launches so that potential customers within the immediate vicinity of the retailer are successfully able to reserve the product.

For example, the process 200 can also involve receiving, at the customer device 100, a third communication identifying a retail location that will have the product in inventory during launch of the product, the retail location within a certain geographic location of the customer device, as shown in block 260. In other embodiments, the third communication identifies a retail location or other location that will assemble or print the product via real-time manufacturing processes. For example, the customer application 102 can determine the geographic coordinates of the customer device 100 and transmit the coordinates to the server device 120. The server device 120 determines the closest retail location that will have the product in inventory/that will manufacture the product based on the geographic coordinates of the customer device 100 or determines if the customer device 100 is within a certain distance of the product launch event. The threshold distance for which to determine if the customer device 100 is within the product launch event can be configured at the server device 120 by the retailer. The customer device 100 receives a third communication from the server device 120 identifying the nearby retail locations that will have the product in proximity. In some embodiments, the information identifying a retail location(s) from the server device 120 can include a graphical map specifying the distance to the retail location and/or launch event and including directions to the retail location and/or launch event. As another example, the customer application 102 can include information specifying where the launch event will take place based on communication previously received from the server device 120. In this example the customer application 102 compares the coordinates of the customer device 100 with the coordinates of the launch event and/or coordinates of a nearby retail location that will have the product in inventory or will manufacture the product via real-time processes. The customer application 102 provides a graphical map indicating the distance to the retail location and/or launch event and include directions to the retail location and/or launch event.

In some aspects, a threshold authentication condition includes identifying that the customer device 100 is within a proximity of the retail location. Thus, the customer may only reserve the product if the customer device 100 is within a certain geographic region (e.g., a certain distance of the launch event). This can be the case when the product launch is a limited edition release to be launched in a city with a large population. In these aspects, the customer application 102 may identify the geographic coordinates of the customer device 100 to confirm that the customer device 100 is within the required threshold distance of the launch event. Thus, the customer application 102 may compare the geographic coordinates of the customer device 100 to the coordinates of the launch event during the reservation process discussed above with respect to block 230.

The process 200 can further include receiving a fourth communication indicating confirmation of the reservation and identifying the retail location that will carry the reserved product or that will manufacture the reserved product via a real-time manufacturing process, as shown in block 270. The confirmation of the reservation can include a unique identifier, such as a barcode or a QR code, identifying the user, the reserved product, and the custom feature of the product selected by the user. Upon product launch, the customer application 102 may provide a notification alerting the customer that the reserved product is ready for purchase and pickup. At the retail location, the unique identifier displayed on the customer application 102 may be scanned by a retailer application 112 executing on a retailer device 110 by a sales agent of the retailer. In some embodiments, the retailer may implement double QR codes, as described above, to ensure that the customer completing the transaction at the cashier is the same customer that reserved the product and picked up the product.

Through the process described above with respects to steps 210-270, the product reservation system allows a retailer to securely control and limit product reservations from potential customers that may be geographically dispersed while ensuring that the received reservation requests are authentic. For example, the server device 120, in some embodiments, generates a reservation of an upcoming and unreleased product if one or more pre-defined conditions are satisfied, the pre-defined conditions determined by the retailer operating or otherwise managing the server device 120. For example, in one embodiment, to ensure that product reservation requests are authentic and being made by real customers and not automated spam bots, the retailer may configure server device 120 to confirm a received reservation request from a customer device 100 only if a message is received from the customer device 100, as discussed above with respect to block 250. In another embodiment, to ensure that reservations are generated only for customers who will be able to physically pick up the product on the day of launch, reservation requests are made only for the customers within a proximity of the launch event.

In another embodiment, a threshold authentication condition includes determining that the software or hardware restrictions of the customer device 100 have not been altered, removed, or otherwise tampered with (i.e. the software operating systems executing on mobile phones that are used by the customers are not "jailbroken" or "rooted"). This threshold authentication condition adds an additional layer of security to the product reservation system where millions of potential customers are geographically dispersed—ensuring that the reservation requests from the customer device 100 is genuine and not transmitted by "hacked" software that may be spoofing the user's location.

Leading up to the product launch event, the server device 120 can provide notifications to the customer device 100 as described above with respect to FIG. 1. During the launch event and during the period of time allocated to the customer for retrieval of the reserved product, the customer may present the unique identifier to an agent of the retailer. For example, the unique identifier is displayed on a user interface of the customer device 100 when the customer enters the retail location corresponding tot eh product launch event. In some embodiments, the customer application 102 is configured to detect when the customer device enters within a threshold distance of the retail location (e.g., via geofencing) and display the unique identifier. In other embodiments, the customer application 102 receives a user input on the user interface to display the user identifier.

The unique identifier is scanned by an agent of the retailer. For example, a retailer sales agent, operating retailer device 110 executing retailer application 112, scans the unique identifier displayed on the customer device 100 via a QR code reader, bar code reader, or other scanning method. By scanning the unique identifier, the retailer device 110 retrieves details of the reservation (e.g., the customer name, contact information, product reserved, and specific custom features selected in the reservation). The details of the reservation may be provided by encoded information in the unique identifier. In other embodiments, upon scanning the unique identifier, the retailer device 110 retrieves the details of the reservation from the server device 120. The server device 120 retrieves the reservation record corresponding to the specific reservation for the customer and transmits the reservation record to the retailer device 102. This allows the retailer to identify the reserved product, allowing the customer to make payment and retrieve the product without having to stand in lines or worry about not receiving the product due to a lottery system.

In certain embodiments, upon displaying a first unique identifier to the agent of the retailer (operating a retailer device 110 executing a retailer application 112), the customer application 102 receives, from the retailer application 112 a second unique identifier. The customer application 102 displays the second unique identifier on the display of the customer device 100. Upon displaying the second unique identifier to a cashier of the retailer, the customer is able to make payment for the product and complete the transaction. The use of dual unique identifiers allows the retailer to provide more security within the retail location and further prevents individuals who have not obtained a reservation from purchasing the product.

In some aspects, the customer application 102 can provide a reservation management console for the customer. The reservation management console allows a user to log in, search for a particular retail location or a group of retail locations, and view and manage product reservations. Information about the previous product reservations can be stored locally in a storage medium at the customer device 10. The customer may log in to reservation management console from the customer device 100. During the product launch, if the customer attempts to retrieve the reserved product but the unique identifier fails to load due to cellular communication issues or a damaged screen, the reservation management console allows the customer to pull up the reservation information and confirmation.

Figure 3B:
FIGS. 3A-3F are examples of screens for a user interface displayed on a mobile application that provides secure geo-targeted product reservation, according to certain embodiments herein.
Figure 3A:
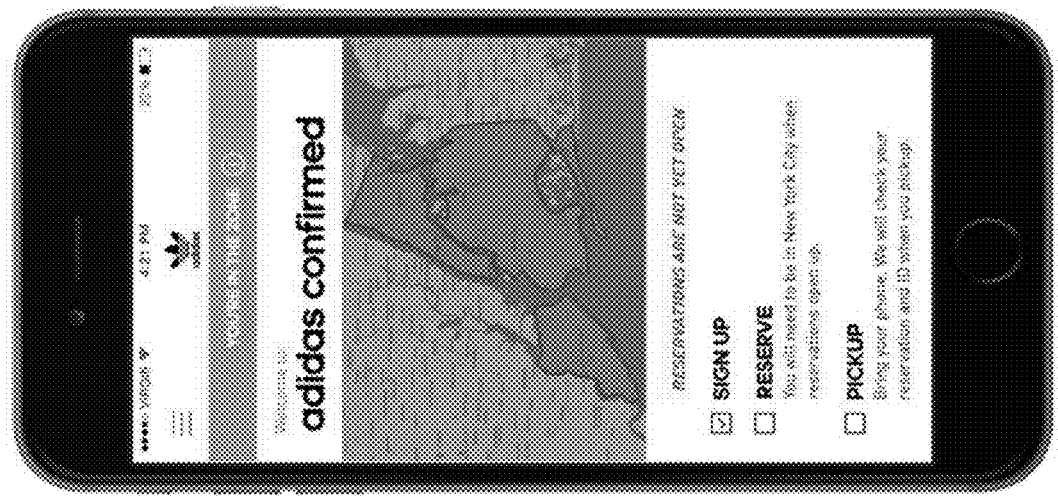
Figure 3D:
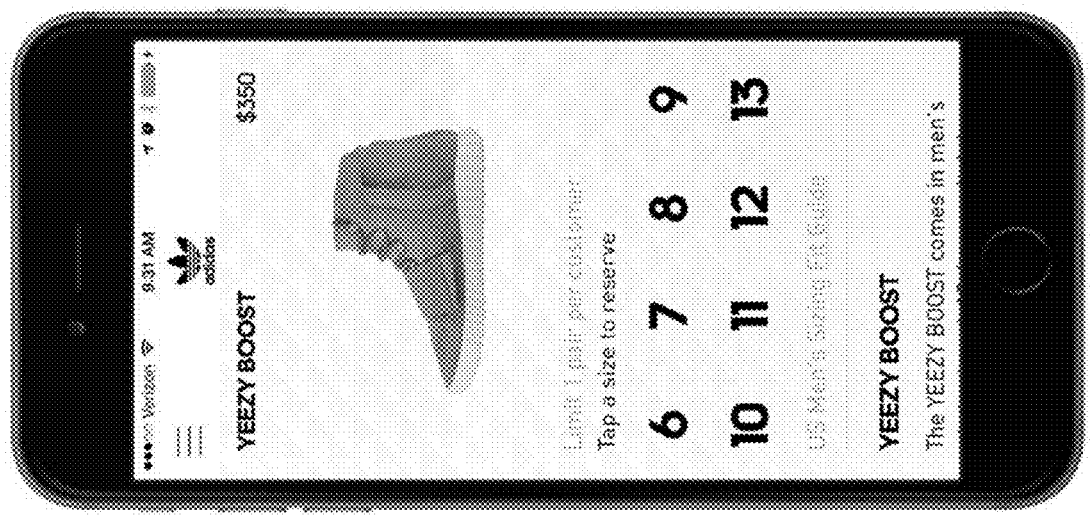

FIGS. 3A-3D depict example screenshots shown by the customer application 102 on the customer device 100 as the customer signs up and reserves an upcoming product. FIG. 3A depicts a screenshot of the customer application 102 on start up. The screenshot in 3A includes prompts allowing the user to sign in to the product reservation system, reserve a product, and pickup a product. In this example, the customer application 102 also shows a map indicating the location of an upcoming product launch event. Since, in this example, the product launch will be specific to a retail location in New York City, the customer application 102 informs the user that the user must be in New York City in order to reserve the product. If the geographic coordinates of the customer device 100 are within a certain distance to the launch event, the customer application 102 can display confirmation that the customer is eligible to reserve the product via the green bar shown in FIG. 3A.

FIG. 3B depicts an example screenshot of customer application 102 where the customer application 102 is displaying information about an upcoming product launch. If reservations are not yet open, the customer application 102 can indicate as such on the user interface.

Figure 3C:

FIG. 3C depicts an example screenshot of customer application 102 where the customer application 102 prompts the user to select a product for reservation. For example, during the time period when the product is available for reservation, the customer application 102 may display a graphical depiction of the product and a prompt asking if the user wishes to reserve the product.

FIG. 3D depicts an example screenshot of customer application 102 where the customer application 102 can prompt the user for selecting customized features of the product. In this example, the customer application 102 queries the customer for the desired size of the footwear. In some embodiments, the customer application 102 also displays a size range prompt allowing the customer to select a size range in case the customer's preferred size is unavailable.

Figure 3F:
Figure 3E:
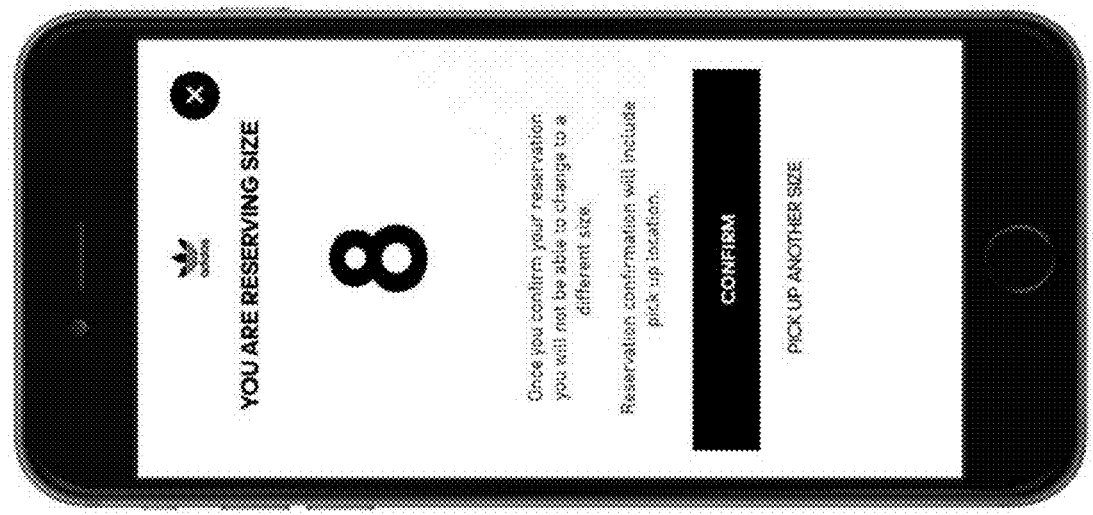

FIG. 3E depicts an example screenshot of customer application 102 where the customer application 102 queries the user for confirming the reservation. In some embodiments, the customer application 102 also displays a countdown prompt—allowing the customer a second opportunity to reserve an alternate product or customization for the product (e.g., size of the footwear) should the desired configuration be unavailable.

In some aspects, reservations for the product launch may be full. FIG. 3F depicts an example screenshot of customer application 102 where the customer application 102 indicates that reservations are full for product. This can further help reduce large crowds and long lines during product launch events.

During launch, customers who reserved the product can arrive at the retail location/launch event to retrieve the product by presenting the unique identification code provided to the customer device 100 during the reservation process. FIG. 4 depicts example screenshots of a retailer application 112 that can be used to scan the unique identifier presented by the customer application 102. As shown in FIG. 4, the retailer application 112 prompts the retail agent to verify the user has the reservation in the customer application 102. As part of this, the retailer application 112 can prompt the retail agent to check for a repeating graphical animation to authenticate the customer application 102. The retailer application 112 can also prompt the retail agent to scan the unique identification code (referred to in the figure as the "consumer's reservation code"). As a further authentication measure, the retailer application 112 can prompt the retail agent to confirm the email address of the customer.

Upon retrieving the reservation information from the unique identifier and verifying the authenticity of the reservation, the retailer can retrieve the product from inventory and complete the transaction with the customer. In other embodiments, upon retrieving the reservation information from the unique identifier and verifying the authenticity of the reservation, the retailer can transmit the product and product configuration details to a controller to initiate a real-time manufacturing process to create the product.

In some aspects, the customer application 102 may display confirmation of retrieval of the product. FIG. 5 depicts an example screenshot of such a confirmation.

Figure 6:
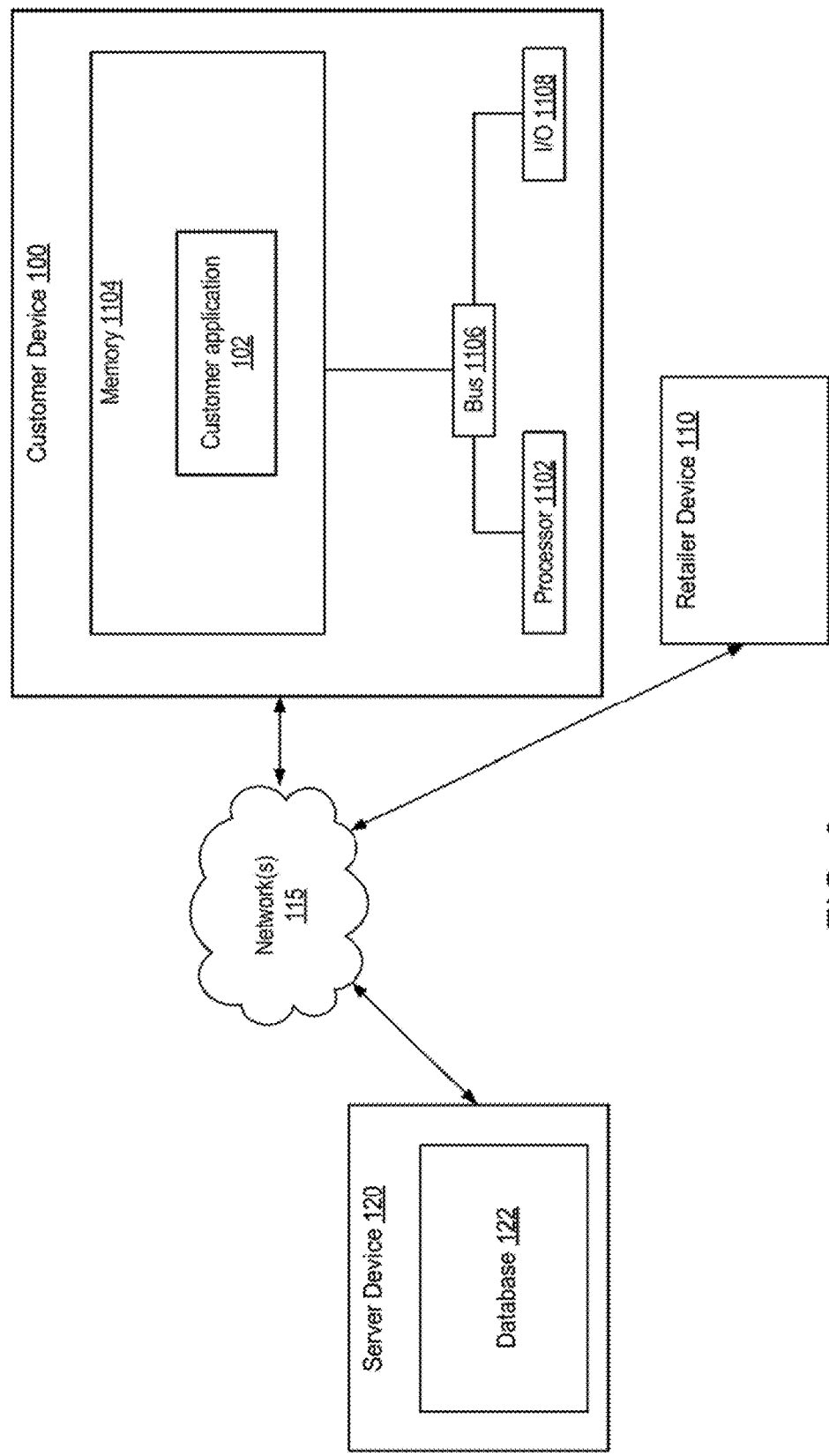
FIG. 6 is a block diagram depicting example hardware implementations for the components described in FIG. 1.

Any suitable computing system or group of computing systems can be used to implement the server device 120, customer device 100, and retailer device 110. FIG. 6 is a block diagram depicting an example of a customer device 100 that executes the customer application 102 for reserving upcoming products for nearby product launches. As described above with respect to FIG. 1, the server device 120 includes a database 122 for storing data indicating details of each reservation from customers placing reservations using customer application 102. For example, the data in database 122 may be stored as separate database records for each reservation. Each database record may comprise the name and contact information for the customer requesting the product reservation using customer application 122, identification of the product the customer is requesting to reserve, and the configuration of the product (e.g., the color and size range of a desired sneaker).

The customer device 100 can include a processor 1102 that is communicatively coupled to a memory 1104 and that executes computer-executable program code and/or accesses information stored in the memory 1104. The processor 1102 may comprise a microprocessor, an application-specific integrated circuit ("ASIC"), a state machine, or other processing device. The processor 1102 can include any of a number of processing devices, including one. Such a processor can include or may be in communication with a computer-readable medium storing instructions that, when executed by the processor 1102, cause the processor to perform the operations described herein.

The memory 1104 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The customer device 100 may also comprise a number of external or internal devices such as input or output devices. For example, the customer device 100 is shown with an input/output ("I/O") interface 1108 that can receive input from input devices or provide output to output devices. A bus 1106 can also be included in the customer device 100. The bus 1106 can communicatively couple one or more components of the customer device 100.

The customer device 100 can execute program code that configures the processor 1102 to perform one or more of the operations described above with respect to FIGS. 1-5. The program code can include, for example, the customer application 102. The program code may be resident in the memory 1104 or any suitable computer-readable medium and may be executed by the processor 1102 or any other suitable processor. The server device 120 and the retailer device 110 can include similar components.

FIG. 7 is a flow chart depicting an example of a process 700 executable by the server device 120 for a geo-targeted product reservation system. For example, the server device 120 may execute a product reservation application 124. For illustrative purposes, the method 700 is described with reference to the implementation in FIG. 1. Other implementations, however, are possible.

The process 700 includes receiving, at the server device for a retailer, an electronic communication from a customer device requesting reservation for an upcoming product planned for launch by the retailer, as shown in block 710. For example, the server device 120 receives an electronic communication from customer device 100, the customer device identifying a product that will be launched by the retailer at a subsequent time. In some embodiments, the server device 120 also receives identification of custom features for the product (e.g., color of the product and size of the product if the product is footwear).

The process 700 further includes transmitting, to the customer device a request for a response to a message (e.g., an SMS text message, tweet, push notification, iMessage, email message, social network tag, or any other suitable electronic message as described above) for authenticating a user of the customer device, as shown in block 720. As described above, successful receipt of the response to the message is a first threshold authentication condition of one or more threshold authentication conditions for generating a reservation for the user. If the request for the reservation was authentic and generated by an actual potential customer (as opposed to a spam bot), the server device 120 receives the response to the message.

In some embodiments, the process 700 further includes determining whether additional threshold authentication conditions are satisfied. For example, as described above, additional threshold authentication conditions include identifying that the customer device 100 is within a geographic proximity of the retail location and determining that the customer device 100 is not rooted or jailbroken. Upon determining that all of the threshold authentication conditions are satisfied, the server device 120 generates a reservation for the customer.

For example, subsequent to receiving, from the customer device, the response to the message, the server device generates the reservation for the user of the customer device, as shown in block 730. In additional embodiments, the server device 120 generates the reservation for the user only upon determining that additional threshold authentication conditions are satisfied as described above. The server device 120 may determine that a threshold authentication condition is satisfied based on information received from the customer device 100. For example, if a second authentication condition specifies that the customer device 100 is located within a geographic proximity of the retailer, the server device 120 may receive coordinates defining the location of the customer device 100. Based on the received coordinates, the server device 120 determines if the customer device 100 is within the geographic proximity of the retailer. In another embodiment, if a second authentication condition specifies that the customer device 100 does not have hardware or software restrictions removed or otherwise altered (i.e. that the device is not rooted or jailbroken), the server device 120 may receive a flag from the operating system of the customer device 100 indicating if the customer device is jailbroken or rooted. Other examples are possible.

Upon generating the reservation, the server device 120 further stores a reservation record for the generated reservation, as shown in block 740. The reservation record includes the name and contact information for the user, identification of the product, and identification of custom features specified in the reservation request. The reservation record is stored in database 122. Upon generating the reservation and storing the reservation record, the server device 120 transmits a confirmation communication to the customer device 100. The confirmation communication identifies the retail location that will have the product in inventory during the launch, confirms the reservation for the user, and includes a unique identifier (e.g., QR code) for authenticating the user of the customer device 100 when retrieving the product.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A non-transitory computer-readable medium comprising program code that is executable by one or more processors of a mobile device for causing the one or more processors to perform operations including:
generating, via a mobile application on the mobile device, a graphical user interface depicting products for sale by a retailer and graphical options corresponding to the products, the graphical options being selectable by a user to reserve the products;
receiving, via the mobile application, a selection from the user of one of the graphical options for reserving a particular product among the products depicted in the graphical user interface;
transmitting, by the mobile application, a request to a server system to create a reservation for the particular product, wherein the server system is configured to:
in response to receiving the request, transmit an electronic communication to the mobile device using a communication channel outside the mobile application for authenticating the reservation, to protect against a bot reserving the particular product, wherein the electronic communication includes one or more details of the reservation; and
prevent the reservation from being completed at least until a reply to the electronic communication is received from the mobile device;
receiving, by the mobile device and via the communication channel outside the mobile application, the electronic communication from the server system;
transmitting, by the mobile device, the reply to the electronic communication to the server system for authenticating the reservation; and
updating, by the mobile application, the graphical user interface to include a reservation confirmation for the particular product.

2. The non-transitory computer-readable medium of claim 1, wherein the operations further comprise:
receiving a notification from the server system of a product launch event relating to the particular product; and
in response to receiving the notification, generating a graphical output in the graphical user interface about the product launch event.

3. The non-transitory computer-readable medium of claim 1, wherein the operations further comprise:
in response to receiving the selection, updating the graphical user interface to provide an image of the particular product and a plurality of available sizes of the particular product;
receiving a selection of a size among the plurality of available sizes from the user; and
configuring the request to reserve the particular product of the size selected by the user.

4. The non-transitory computer-readable medium of claim 1, wherein the operations further comprise, during a first time period:
configuring the graphical user interface to indicate that reservations are closed for the particular product; and
preventing the particular product from being reserved.

5. The non-transitory computer-readable medium of claim 4, wherein the operations further comprise, during a second time period that is different from the first time period:
configuring the graphical user interface to indicate that reservations are open for the particular product; and
allowing the particular product to be reserved.

6. The non-transitory computer-readable medium of claim 1, wherein the particular product is footwear.

7. The non-transitory computer-readable medium of claim 1, wherein the operations further comprise determining whether to allow the reservation of the particular product by:
comparing a first geographical location associated with the user to a second geographical location associated with the particular product; and
preventing the reservation of the particular product in response to determining that the first geographical location associated with the user is outside a predefined distance of the second geographical location associated with the particular product.

8. A method comprising:
generating, by a mobile application executing on a mobile device, a graphical user interface depicting products for sale by a retailer and graphical options corresponding to the products, the graphical options being selectable by a user to reserve the products;
receiving, by the mobile application, a selection from the user of one of the graphical options for reserving a particular product among the products depicted in the graphical user interface;
transmitting, by the mobile application, a request to a server system to create a reservation for the particular product, wherein the server system is configured to:
in response to receiving the request, transmit an electronic communication to the mobile device using a communication channel outside the mobile application for authenticating the reservation, to protect against a bot reserving the particular product, wherein the electronic communication includes one or more details of the reservation; and
prevent the reservation from being completed at least until a reply to the electronic communication is received from the mobile device;
receiving, by the mobile device and via the communication channel outside the mobile application, the electronic communication from the server system;
transmitting, by the mobile device, the reply to the electronic communication to the server system for authenticating the reservation; and
updating, by the mobile application, the graphical user interface to include a reservation confirmation for the particular product.

9. The method of claim 8, further comprising:
receiving, by the mobile application, a notification from the server system of a product launch event relating to the particular product; and
in response to receiving the notification, generating, by the mobile application, an output to the user indicating the product launch event.

10. The method of claim 8, further comprising, in response to receiving the selection:

updating, by the mobile application, the graphical user interface to provide an image of the particular product and a plurality of available sizes of the particular product;

receiving, by the mobile application, a selection of a size among the plurality of available sizes from the user; and configuring, by the mobile application, the request to reserve the particular product of the size selected by the user.

11. The method of claim 8, further comprising, during a first time period:

configuring, by the mobile application, the graphical user interface to indicate that reservations are closed for the particular product; and preventing, by the mobile application, the particular product from being reserved.

12. The method of claim 11, further comprising, during a second time period that is subsequent to the first time period:

configuring, by the mobile application, the graphical user interface to indicate that reservations are open for the particular product; and allowing, by the mobile application, the particular product to be reserved.

13. The method of claim 8, wherein the particular product is footwear.

14. The method of claim 8, further comprising determining whether to allow the reservation of the particular product by:

comparing a first geographical location associated with the user to a second geographical location associated with the particular product; and allowing the reservation of the particular product in response to determining that the first geographical location associated with the user is within a predefined distance of the second geographical location associated with the particular product.

15. A system comprising:

one or more processors; and a non-transitory computer-readable medium comprising program code that is executable by the one or more processors for causing the one or more processors to perform operations including:

generating, via a mobile application, a graphical user interface depicting products for sale by a retailer and graphical options corresponding to the products, the graphical options being selectable by a user to reserve the products;

receiving, via the mobile application, a selection from the user of one of the graphical options for reserving a particular product among the products depicted in the graphical user interface;

transmitting, via the mobile application, a request to a server system to create a reservation for the particular product, wherein the server system is configured to:

in response to receiving the request, transmit an electronic communication to the user using a communication channel outside the mobile application for authenticating the reservation, to protect against a bot reserving the particular product, wherein the electronic communication includes one or more details of the reservation; and prevent the reservation from being completed at least until a reply to the electronic communication is received from the user; and updating, via the mobile application, the graphical user interface to include a reservation confirmation for the particular product.

16. The system of claim 15, wherein the operations further comprise:

receiving a notification from the server system of a product launch event relating to the particular product; and in response to receiving the notification, generating a graphical output in the graphical user interface about the product launch event.

17. The system of claim 15, wherein the operations further comprise, in response to receiving the selection:

updating the graphical user interface to provide an image of the particular product and a plurality of available sizes of the particular product;

receiving a selection of a size among the plurality of available sizes from the user; and configuring the request to reserve the particular product of the size selected by the user.

18. The system of claim 15, wherein the operations further comprise, during a first time period:

configuring the graphical user interface to indicate that reservations are not yet open for the particular product; and preventing the particular product from being reserved.

19. The system of claim 18, wherein the operations further comprise, during a second time period that is subsequent to the first time period:

configuring the graphical user interface to indicate that reservations are open for the particular product; and allowing the particular product to be reserved.

20. The system of claim 15, wherein the particular product is footwear.

* * * * *